UNITED STATES PATENT OFFICE.

JAMES P. GAY, OF CINCINNATI, OHIO, ASSIGNOR TO HIMSELF AND DAVID C. KING, OF SAME PLACE.

COMPOSITION FOR ROOFING PURPOSES.

Specification forming part of Letters Patent No. 30,217, dated October 2, 1860.

*To all whom it may concern:*

Be it known that I, JAMES P. GAY, of the city of Cincinnati, in the county of Hamilton and State of Ohio, have invented a new and useful Improvement in Roofing Compositions; and I do hereby declare that the following is a full, clear, and exact description of the same.

Take eighty parts, by weight, Carolina pitch; eighty parts, by weight, candle-pitch; three parts, by weight, flowers of sulphur; eight parts, by weight, linseed-oil; three parts, by weight, litharge; eighty parts, by weight, naphtha; three parts, by weight, gutta-percha; three parts, by weight, caoutchouc. Melt the Carolina and candle pitches together at a gentle heat, and add the flowers of sulphur, thoroughly mixing them together. Have the linseed-oil previously boiled with the litharge, and when the pitch and sulphur mass is partially cooled add the cold boiled linseed-oil. Dissolve the gutta-percha and caoutchouc in the naphtha and add to the compound previously prepared, thoroughly stirring and mixing the whole together until the mass is of a uniform consistence throughout, when it is ready for use.

This composition may be used upon a surface either of canvas, wood, or metal. It is applied in a cold state by means of a brush, in the same manner as paint.

When this composition is to be used in coating a surface of canvas, the canvas is first saturated with the composition and then nailed onto the roof or wall or side of the building to be covered. After being nailed down a coat of composition is applied with a brush, as before described, and the entire surface is at once "dusted" with fine clean builders' sand. Ordinarily it is not deemed necessary to use more than one coat of composition and sand; but if it is thought desirable a second coat may be applied over the first after being sanded, and thus a thicker layer of the protective material be secured.

The composition may be used either with or without sand. When employed without sand, and where it is desirable to modify the natural color of the compound, which is a jet black, a pleasant chocolate color may be produced by adding and thoroughly mixing therewith the following ingredients: twenty parts, by weight, Venetian red; ten parts, by weight, white lead previously mixed with ten parts, by weight, naphtha.

To produce and impart to the composition a straw color, add to the original compound the following: twenty parts, by weight, yellow ocher; ten parts, by weight, white lead previously mixed with ten parts, by weight, naphtha.

This composition, whether used with or without the coloring ingredients, adheres to wooden or metallic surfaces, as well as to canvas, with the greatest tenacity. It is, moreover, elastic, and readily accommodates itself to the expansion and contraction of the surface upon which it is spread, thus avoiding cracks. It dries rapidly, and after becoming dry is not melted or rendered fluid by the heat of the sun. It is impervious to water, and resists the action of the elements of decay both in air and water; hence it may be used to great advantage as a coating for the hulls of vessels.

Compounds containing coal-tar and some other substances are highly destructive of textile and metallic substances to which they are applied. The ingredients of my composition are, on the contrary, none of them destructive to the most delicate textile fabrics nor of metals, but highly preservative of both.

The candle-pitch herein named is a glutinous substance, left as a residue in the process of manufacturing stearine and lard-oil from lard. The other ingredients herein named are well known in the arts.

Having described my invention, I proceed to state what I claim and what I wish by Letters Patent to secure.

The composition herein described, consisting of the various ingredients in the proportions named, or similar proportions, substantially as and for the purpose described.

JAMES P. GAY.

Witnesses:
 WM. CLOUGH,
 GEO. PYBURN.